US006172983B1

(12) United States Patent
Shaffer et al.

(10) Patent No.: US 6,172,983 B1
(45) Date of Patent: *Jan. 9, 2001

(54) HUB DOMINATED METHOD AND SYSTEM FOR MANAGING NETWORK COLLISIONS

(75) Inventors: Shmuel Shaffer; David Weiss, both of Palo Alto; Charles Marcus White, San Jose, all of CA (US)

(73) Assignee: Siemens Information and Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/816,979

(22) Filed: Mar. 13, 1997

(51) Int. Cl.[7] ................................. H04L 12/44
(52) U.S. Cl. ........................... 370/446; 370/448
(58) Field of Search ................... 370/432, 445, 370/446, 448

(56) References Cited

U.S. PATENT DOCUMENTS

| | | |
|---|---|---|
| 4,998,247 | 3/1991 | Irvine-Halliday et al. . |
| 5,109,379 | * 4/1992 | Kume et al. . |
| 5,351,241 | * 9/1994 | Yehonatan . |
| 5,355,375 | * 10/1994 | Christensen . |
| 5,436,903 | 7/1995 | Yang et al. . |
| 5,546,385 | 8/1996 | Caspi et al. . |
| 5,568,476 | * 10/1996 | Sherer et al. . |
| 5,771,235 | * 6/1998 | Tang et al. ................ 370/446 |

FOREIGN PATENT DOCUMENTS 0707 397 A2   4/1996   (EP) .

OTHER PUBLICATIONS

Seifert, Rich, *Technical Report: The Effect of Ethernet Behavior on Networks Using High–Performance Workstations and Servers*, Networks and Communications Consulting, Mar. 1, 1995.

* cited by examiner

Primary Examiner—Hassan Kizou
Assistant Examiner—Ahmed Elallam (57) ABSTRACT

A network having a number of terminals connected by a hub includes managing data transmission collisions by distinguishing among the terminals following a transmission. In the preferred embodiment, the terminals are arranged in a star configuration and the hub is an Ethernet hub that forwards a data packet from a terminal to all of the remaining terminals. A data packet is stored in memory while it is transmitted to all of the other terminals in the collision domain. If a collision is detected in forwarding the data packet, the transmission is completed to the collision-free terminals, thereby isolating subsequent forwarding of the data packet to the one or more collision-inducing terminals. When a no-carrier condition is sensed, the data packet is retransmitted to the one or more collision-inducing terminals. Preferably, a back-off scheme provides priority to the hub-to-terminal transmissions over the terminal-to-hub transmissions, so that the probability of repeated collisions between the same packets is significantly reduced. After all of the terminals have received the transmission of the data packet, the packet is deleted from memory. A memory threshold may be established in order to prevent the storage of the data packets from reaching a condition in which packets are lost. A pseudo-collision condition may be generated within any incoming data packets when the memory threshold is exceeded or to provide a correction if one of the terminals has "captured" the network.

15 Claims, 5 Drawing Sheets

| Collision on Attempt # | Estimate of # of Other Stations Offering Load (2 Attempt-1) | Random # Range N-1 0...2 | Range of Back-off Times (Random # * 51.2 μs) |
|---|---|---|---|
| 1 | 1 | 0...1 | 0...51.2 μs |
| 2 | 3 | 0...3 | 0...153.6 μs |
| 3 | 7 | 0...7 | 0...358.4 μs |
| 4 | 15 | 0...15 | 0...768 μs |
| 5 | 31 | 0...31 | 0...1.59 ms |
| 6 | 63 | 0...63 | 0...3.23 ms |
| 7 | 127 | 0...127 | 0...6.50 ms |
| 8 | 255 | 0...255 | 0...13.1 ms |
| 9 | 511 | 0...511 | 0...26.2 ms |
| 10 | 1023 | 0...1023 | 0...52.4 ms |
| 11 | 1023 | 0...1023 | 0...52.4 ms |
| 12 | 1023 | 0...1023 | 0...52.4 ms |
| 13 | 1023 | 0...1023 | 0...52.4 ms |
| 14 | 1023 | 0...1023 | 0...51.4 ms |
| 15 | 1023 | 0...1023 | 0...52.2 ms |
| 16 | Too High | N/A | Discard Frame |

TABLE 1: BACK-OFF CALCULATIONS

FIG_1

(PRIOR ART)

FIG._2

FIG_3

FIG-4

FIG_5

HUB DOMINATED METHOD AND SYSTEM FOR MANAGING NETWORK COLLISIONS

BACKGROUND OF THE INVENTION

The invention relates generally to methods and systems for managing data transmissions within a network and more particularly to methods and systems for managing data collisions and retransmissions within a network having a number of terminals connected to a common hub.

DESCRIPTION OF THE RELATED ART

A local area network (LAN) permits data communications among a number of interlinked terminals, typically computers. The control of a LAN may be centralized or distributed. Centralized control typically includes a single device that manages data communications among the terminals. On the other hand, in a distributed control network, the terminals cooperatively control the operation of the network. The software and hardware for governing transmissions and receptions of messages in the form of data packets are included in each of the terminals that form the network. An advantage of the distributed control scheme is that adding or removing a terminal from the network can be easily accomplished.

There are a number of different configurations (i.e., topologies) for LANs. In a mesh network, all of the terminals are connected to all other terminals. In comparison, a ring network connects the terminals one-by-one to form a continuous loop. Another alternative is a star-configured network in which all of the terminals are connected at a "center". The interconnection at the center may be simplified by using a hub. The hub may be a switching hub that routes data packets only to the terminal or terminals for which the data packets are intended. Each packet has a header that identifies the destination terminal. The switching hub determines the destination of a data packet from its header and routes the packet to the appropriate destination. Switching hubs are particularly suited for networks in which performance requirements require that only selected terminals receive data packets.

Most LANs that include a hub do not utilize a switching hub. Instead, a common bus is formed within the hub. Data packets are transmitted to all of the terminals within the network. That is, each terminal is a "destination terminal," but may not be the intended terminal. When a packet is received at a terminal, the header of the packet is read to determine whether the terminal is the intended terminal. An intended terminal reads and processes the data packet, while the other terminals discard the packet. The intended terminal may transmit an acknowledgment (ACK) signal to the originating terminal, since the originating terminal would retransmit the data packet if the ACK signal were not received.

Within a LAN having a hub that forwards the data packets to the various terminals, there must be a protocol for determining accessibility to the hub. The protocol within an Ethernet network is referred to as a Carrier Sense Multiple Access (CSMA) protocol. A terminal that is prepared to transmit a data packet "listens" to determine whether the network is free or is being used by another terminal. Typically, all of the terminals have equal priority and begin transmitting if the network is free. Once the transmission is initiated, the other terminals in the network will sense that the network is busy, and will refrain from initiating a transmission. However, there are times at which two terminals will begin transmitting simultaneously, causing a transmission collision. Therefore, the Ethernet network typically includes CSMA with Collision Detection (CSMA/CD).

Figure 1:
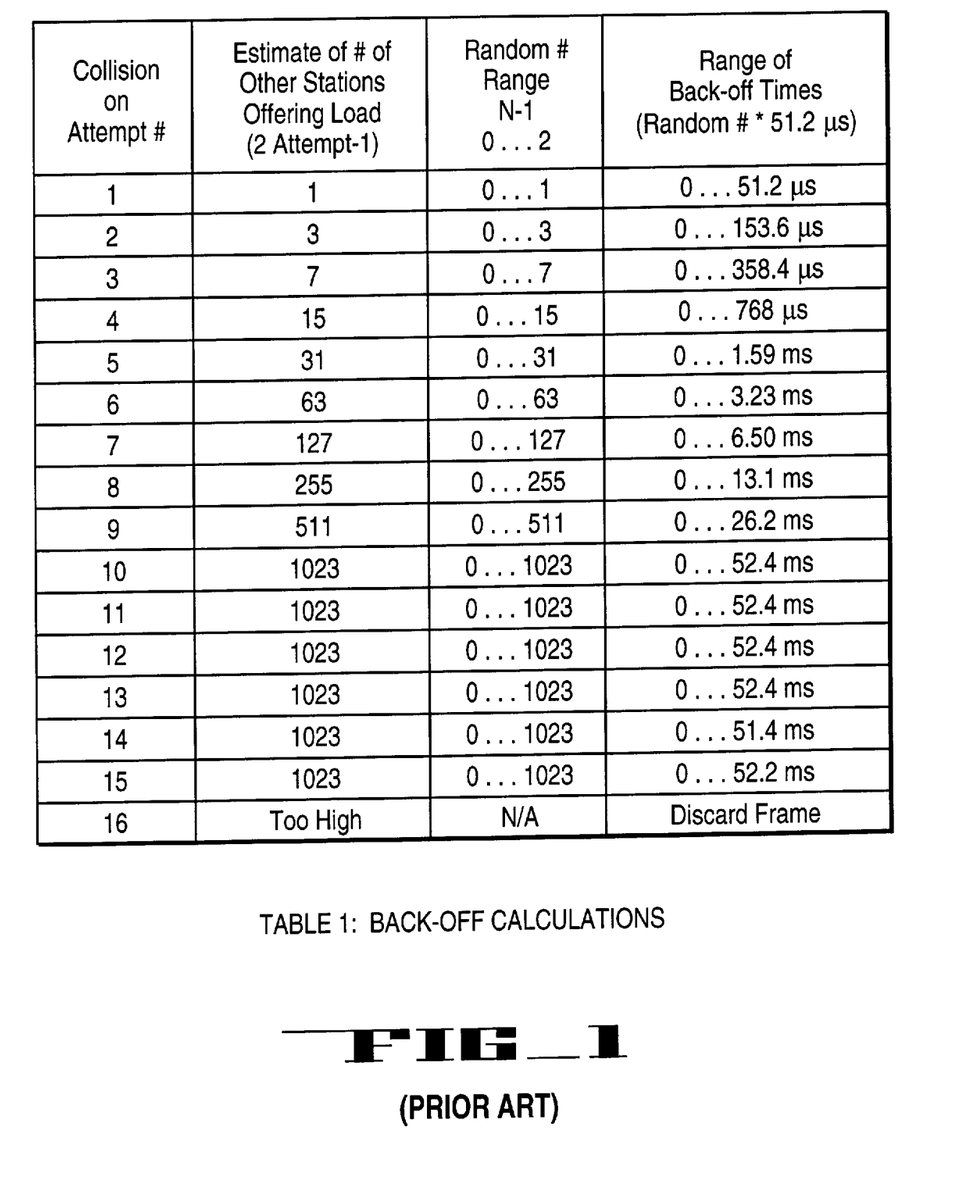
FIG. 1 is a table of back-off calculations in accordance with the prior art.

U.S. Pat. No. 4,536,903 to Yang et al. describes the CSMA/CD protocol. If two terminals, or "nodes", initiate transmissions and detect a collision of the data packets, the terminals terminate the transmissions. At each terminal, a back-off time is calculated. The calculation is provided by a back-off algorithm that is the product of a slot time of 51.2 $\mu s$ times a number within a defined range. The range depends upon the number of collisions encountered by a particular data packet. If the data packet encounters repeated collisions, it is assumed that the workload is high and that the average back-off time should be greater. FIG. 1 is a table of the back-off calculations executed in an Ethernet network.

One concern in the application of the back-off algorithm of FIG. 1 is that one terminal may "capture" the network. The capture effect is identified in Yang et al. If two terminals initiate transmissions simultaneously, a first collision will occur. As shown in the table of FIG. 1, each terminal will select a back-off time of either 0 or 1 times the slot time of 51.2 $\mu s$. If a first terminal selects 0 back-off time and the second terminal selects 1 slot time as its back-off time, the first terminal will successfully transmit its first packet. Assuming that the first terminal has a second data packet to transmit, the two terminals will again contend for access to the network after completion of the first successful transmission. A collision will again occur. However, the data packet of the first terminal will encounter a first collision, while the data packet of the second terminal will encounter its second collision. As a result, the first terminal will be selecting within the range of 0 to 1, while the second terminal will be selecting within the range of 0 to 3, as shown in FIG. 1. Clearly, the first terminal is more likely to be successful. The likelihood increases if the first terminal is successful and the same two terminals contend for access following the second transmission by the first terminal. The data packet of the second terminal will encounter a third collision and the second terminal will be selecting within the range 0 to 7. If the process continues 16 times, the data packet of the second terminal will be discarded. Thus, a data packet will be lost because the first terminal was able to capture the network.

Yang et al. describes a method of reducing the adverse effects of the capture effect. The Ethernet standard of determining back-off calculations, as shown in FIG. 1, is modified in the event that a terminal captures the network communication channel. Upon detecting such an event, the method provides a less aggressive, i.e. longer, back-off time before at least the first retransmission attempt made by a node that has captured the channel. In addition, a stopped back-off algorithm may be used to reduce the adverse effects of a capture condition. The method operates well for its intended purpose, but under certain conditions implementing the less aggressive back-off calculation and/or providing the stopped back-off algorithm may increase the latency of the network.

Another method of reducing the likelihood that one terminal will capture the network to the exclusion of other terminals is to minimize or eliminate collisions between data packets. Networks designed for collision-free communications are described in U.S. Pat. Nos. 5,546,385 to Caspi et al. and 4,998,247 to Irvine-Halliday et al. The Caspi et al. network utilizes a switched hub for selectively routing the data packets to intended terminals. The use of switched hubs to avoid collisions is described above and is known in the art. The network includes communication ports that determine a destination port for each incoming communication and then perform interleaved transfers of the packets to a set of virtual transmit first-in-first-out (FIFO) memories that buffer the packets for outbound transfer. Irvine-Halliday et al. describes a network that utilizes a controller hub as an alternative to CSMA/CD processing. The controller hub immediately relays a data packet from one of the terminals to a desired destination terminal when the packet is the only packet received by the controller hub. However, when a number of packets are simultaneously received by the controller from different terminals, the controller immediately relays a selected packet, while temporarily storing the other packets for subsequent transmission. If more than one terminal is intended for reception of a packet, the transmission of the packet is made to all of the intended terminals simultaneously. Each terminal is connected to the controller hub by two high-speed links, which provide full-duplex capability. The full-duplex capability eliminates collisions between packets that are simultaneously incoming and outgoing from a terminal.

The networks of Caspi et al. and Irvine-Halliday et al. are designed to avoid collisions. The networks operate well, but at an increased cost. Moreover, under some conditions, the networks may increase latency.

Packet collisions are not necessarily detrimental to the operation of a network. Collision events may be used effectively to control access to a shared channel among various terminals in the network. What is needed is a method and network for managing data transmission collisions such that a high network throughput and a low network latency are achieved in a cost efficient manner.

SUMMARY OF THE INVENTION

A method of managing data transmission collisions within a network of terminals connected by a hub includes retaining a data packet in storage at the hub when a transmission collision is detected in forwarding the data packet to at least one collision-inducing destination terminal. Transmission to the collision-inducing destination terminal or terminals is terminated, but transmission is completed to remaining destination terminals for which forwarding is collision-free. Therefore, the method isolates subsequent forwarding of the data packet to the transmission-inducing destination terminals from the completed transmission to the collision-free terminals. Then, when a collision-free condition is determined to be available between the hub and the collision-inducing destination terminal or terminals, the data packet is forwarded.

In the preferred embodiment, the network and data packet transmissions utilize a Carrier Sense Multiple Access with Collision Detection (CSMA/CD) protocol to determine accessibility for transmitting data packets. Also in the preferred embodiment, the back-off algorithm is implemented to establish a higher priority for packet transmissions from the hub to the terminals relative to packet transmissions from the terminals to the hub.

In order to minimize the adverse effects that would occur if one terminal were to capture the network to the exclusion of transmissions by other terminals, the method preferably includes monitoring retransmissions after collisions, so as to identify when a terminal is repeatedly successful in gaining access to the hub following transmission collisions. Collision events may be intentionally induced in order to reduce the likelihood that the repeatedly successful terminal will prevent another terminal from successfully gaining access.

The overflow of data packets at the memory of the hub is prevented by placing the hub in a blocking mode when stored data packets exceed a preselected memory threshold. The blocking mode may be implemented by triggering pseudo-collision conditions for any data packets directed at the hub while the memory threshold is exceeded.

The network that utilizes the collision management method includes the hub having sufficient buffer memory for storing data packets, the terminals connected to the hub by channels for exchanging the data packets, a hub carrier sense circuit at the hub to determine on a terminal-by-terminal basis the accessibility of the terminals, and a transmission tracker for determining on a terminal-by-terminal and packet-by-packet basis which terminals have received individual packets and which terminals are yet to receive individual packets. Thus, the network is able to distinguish the terminals in a packet-by-packet basis. In the preferred embodiment, the terminals are connected to the hub in a star configuration having a half-duplex arrangement and the hub is an Ethernet hub.

DETAILED DESCRIPTION

Figure 2:
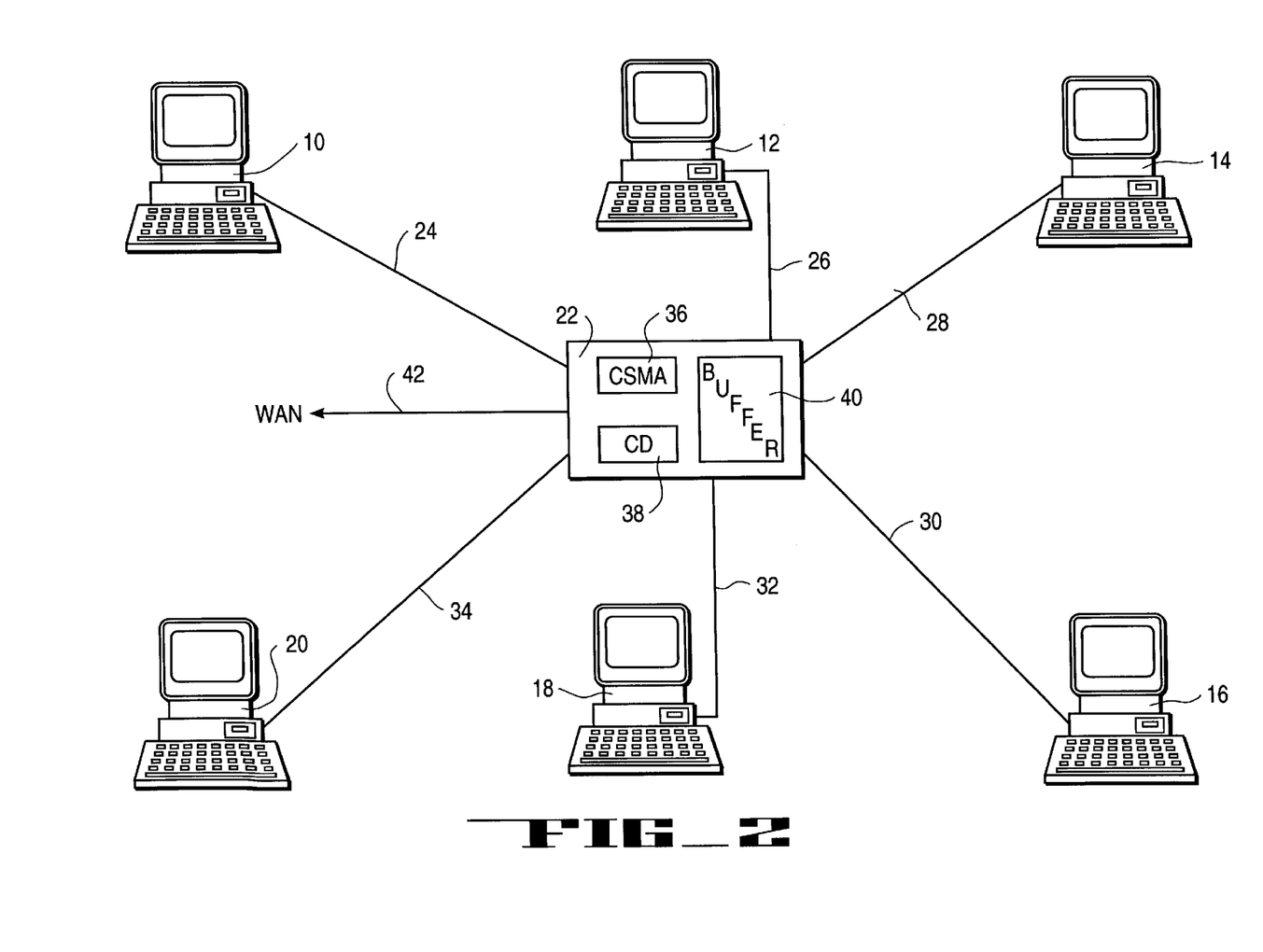
FIG. 2 is a block diagram of a network that utilizes collision management in accordance with the invention.

With reference to FIG. 2, a network is shown as having a star configuration of six terminals 10, 12, 14, 16, 18 and 20 connected to a hub 22. In the preferred embodiment, the network is an Ethernet network that utilizes Carrier Sense Multiple Access with Collision Detection (CSMA/CD) protocol. However, other networks that have collision detection may utilize the method to be described below.

Each terminal 10–20 is linked to the hub by a channel 24, 26, 28, 30, 32 and 34. Physically, the channels may be twisted-pair cables, coaxial cables, or fiberoptic cables. Alternatively, the channels may be wireless. The terminals are shown as personal computers, but other data access devices that transmit and receive data packets may be substituted.

In the preferred embodiment, the hub 22 does not route data packets from an originating terminal 10–20 to any specific terminal. Rather, all of the terminals are destination terminals. Consequently, each data packet that is directed to the hub 22 from one of the terminals is forwarded to all of the other terminals. Upon receiving a data packet, a terminal processes the header to determine whether the message is intended for that terminal. Typically, only the intended terminal processes the remainder of the packet. The intended terminal also may transmit an acknowledgment signal to the originating terminal, so that the original terminal is notified that retransmission of the same data packet is not required.

The hub 22 is shown as including a CSMA circuit 36. As is well known in the art, such a circuit is utilized to determine whether a network is free for initiating a packet transmission. A terminal or hub that is prepared to transmit a data packet "listens" to determine whether the network is busy or is free. The hub 22 also includes a collision detection circuit 38. Once a transmission is initiated, the collision detection circuit determines whether the transmitted data packet has collided with another data packet. If so, the transmission is terminated and a back-off time is calculated prior to retransmission of the data packet. As previously noted, FIG. 1 is a table of the standard back-off calculations executed in an Ethernet network.

In addition to the CSMA circuit 36 and the collision detection circuit 38, the hub 22 includes a buffer memory 40. When a data packet is received at the hub from one of the terminals 10–20, the data packet "dominates" the collision domain defined by the local area network (LAN). This first data packet is stored at the buffer memory 40, while it is transmitted to all of the terminals on the collision domain. If the packet is transmitted without a collision, it is deleted from the buffer memory. However, if a second terminal transmits a second data packet during the forwarding of the first data packet to the terminals, a collision will occur and will be sensed by the collision detection circuit 38.

The hub 22 of FIG. 2 isolates the collision to a single channel. Thus, if the first data packet originated from the terminal 10 and the second data packet that caused the collision originates from the terminal 18, the retransmission following a back-off time will be isolated to the terminal 18 via channel 32. In the preferred embodiment, the back-off calculations at the hub 22 and the terminal 18 will be different, allowing the hub to have priority in its retransmissions. For example, the hub may be allotted the back-off time of 0×51.2 µs. After the stored data packet has been successfully transmitted from the hub 22 to the terminal 18, the data packet is deleted from the buffer 40.

By designating the hub 22 as the higher priority device in transmissions of data packets, the size of buffer 40 may be kept small. By isolating the collision to a single channel, such as channel 32, the idle time of the physical layer of the LAN is reduced. As a result, a higher network throughput is achieved and data packets experience an average shorter latency through the network.

The hub 22 is also shown as being connected to a wide area network (WAN) via a channel 42. Transmissions and receptions of data packets to and from the WAN are handled in a conventional manner. The connection to the WAN is not critical to the invention. It should be noted that when two hubs are connected to each other, conventional back-off time calculations should be utilized for collisions between the two hubs.

Figure 3:
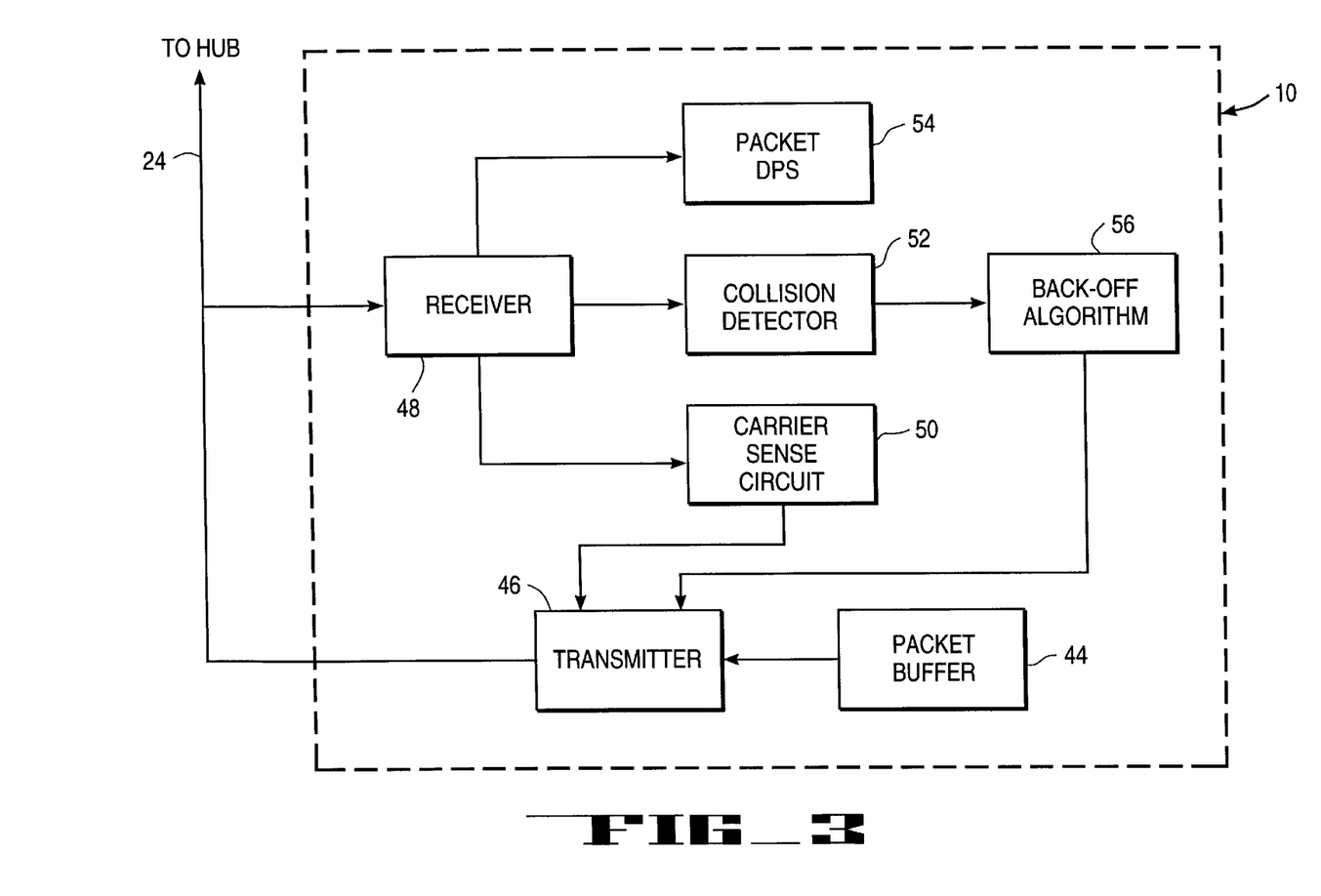
FIG. 3 is a block diagram of the components of one terminal of FIG. 2.

Referring now to FIG. 3, circuitry of the terminal 10 is shown as including a packet buffer 44 and a transmitter 46 connected to the channel 24 to the hub. Data packets that are properly processed for transmission to the hub are stored at the packet buffer 44 until the driver of the transmitter 46 is activated. All of the components of the terminal 10 of FIG. 3 are conventional to terminals in an Ethernet network.

The terminal 10 includes a receiver 48 that is connected to a carrier sense circuit 50, a collision detector 52, and a data packet digital processing system (DPS) 54. When the transmitter 46 is prepared to forward a data packet from the buffer 44, the carrier sense circuit 50 is used to determine the availability of the connection 24 to the hub. If the connection is not busy, the carrier sense circuit signals the transmitter that the data packet may be sent. On the other hand, the transmission is delayed if the carrier sense circuit determines that the connection is busy.

The collision detector 52 is utilized after the transmission of a data packet from the buffer 44 is initiated by the transmitter 46. In the event that an incoming data packet is launched at approximately the same time as the transmission from the packet buffer 44, the collision detector will terminate the outgoing transmission and will trigger implementation of the back-off algorithm 56. For example, the standard Ethernet back-off table of FIG. 1 may be utilized. The back-off time is a random selection within a range determined by the number of collisions the same data packet has encountered. Following the back-off time, a retransmission is initiated. The CSMA/CD protocol executed at the terminal 10 is well known in the art.

The packet DPS 54 receives incoming data packets and processes the packets using techniques known in the art. Preferably, the terminal 10 transmits an acknowledgment signal that the data packet has been received.

Figure 4:
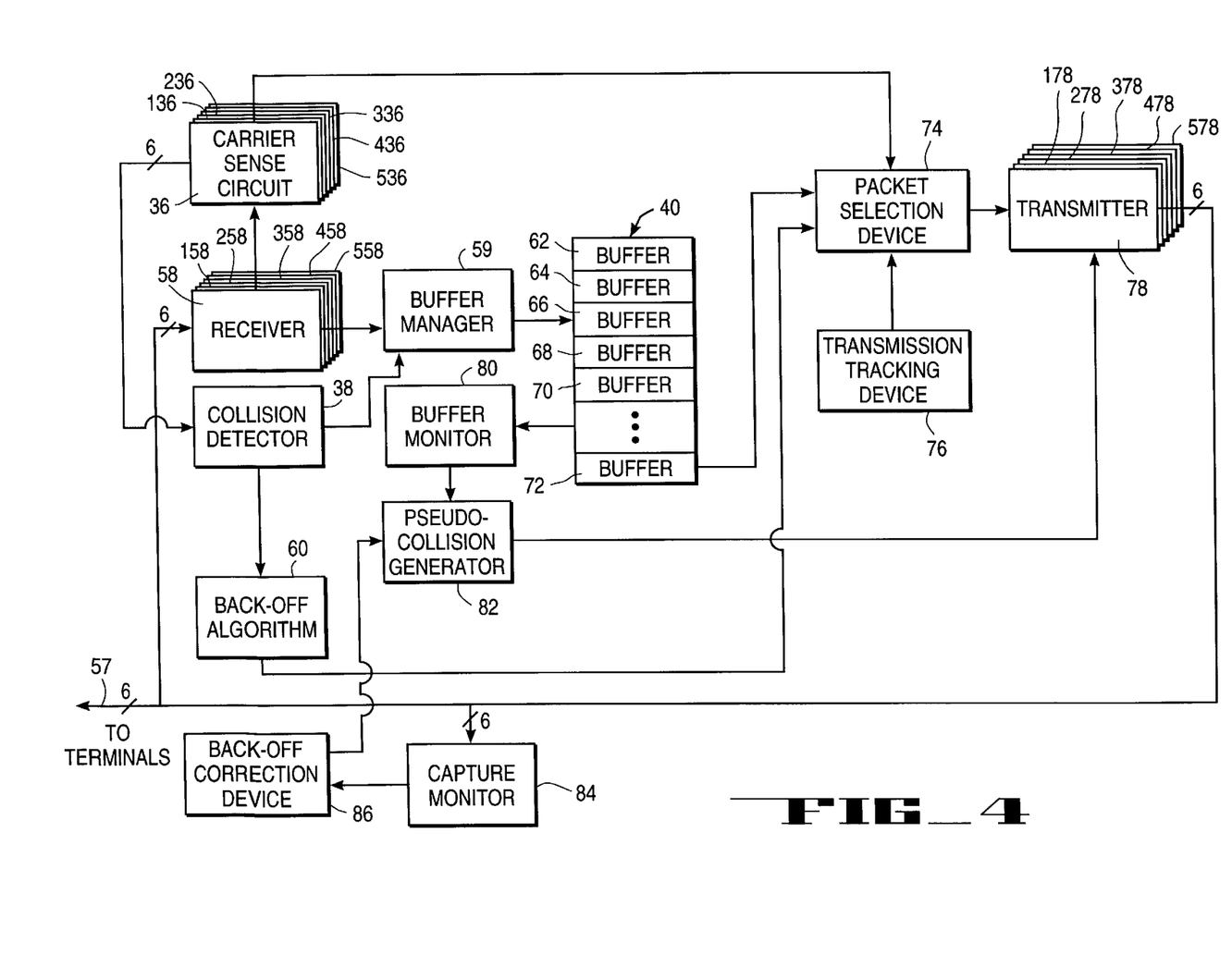
FIG. 4 is a block diagram of the components of the hub of FIG. 2.

FIG. 4 illustrates components of the hub 22 of FIG. 2. In one embodiment, the hub includes six channels, with each channel being accessed by one of the six terminals 10–20 of FIG. 1. The six channels are represented by a single line 57 in FIG. 4. The hub is shown as including six receivers 58, 158, 258, 358, 458 and 558. Each receiver is associated with a different terminal and with one of six carrier sense circuits 36, 136, 236, 336, 436 and 536. Each carrier sense circuit is used to monitor the availability of connections to the terminal associated with that terminal. Each carrier sense circuit of the hub functions in the same manner as described with reference to terminal 10 in FIG. 3. Similarly, the collision detector 38 functions in the same manner as the collision detector 52 in FIG. 3, but is connected to each of the six carrier sense circuits to detect a collision regardless of which of the six channels are involved in the collision event.

In the preferred embodiment, the back-off algorithm device 60 of the hub 22 is different than the back-off algorithm device 56 of FIG. 3. Preferably, the range of times for the calculation of a back-off delay is less for the hub than it is for an individual terminal 10–20. In fact, the back-off delay may be 0 for the hub, so that a retransmission after a collision is substantially immediate. The shorter back-off times at the hub ensure that the hub is given priority in retransmitting data packets following a collision. The priority scheme is designed to increase throughput, reduce packet latency, and reduce the required size of the buffer memory 40.

As previously noted, data packets received from the terminals 10–20 at the hub 22 are stored at the buffer memory 40. A buffer manager 59 forwards the packets from the receivers 58, 158, 258, 358, 458 and 558 to the buffer memory. As shown in FIG. 4, the memory includes a number of buffer locations 62, 64, 66, 68, 70 and 72. Each buffer location is capable of storing a single data packet. The buffer manager also has an input from the collision detector 38. If a collision event is detected while the buffer manager is writing a first data packet to a particular buffer location, the transmission of the first data packet from the sending terminal will be terminated. Thus, the buffer location will receive only a portion of the first data packet. The buffer manager is informed of the collision by the collision detector 38, and discards the uncompleted first data packet from the buffer location. As a result, collision-corrupted packets are not stored at the buffer memory for transmission to the terminals.

In one embodiment, the memory 40 is a first-in-first-out device, so that the data packets are forwarded to the various terminals 10–20 in the same order that they are received. In another embodiment, the hub includes a packet selection device 74 that determines which buffer location 62–72 is accessed during a transmission. For example, if the data packet in buffer location 62 is awaiting transmission to all of the destination terminals, while the data packet in buffer location 64 has been transmitted to all of the destination terminals other than terminal 16, the device 74 may select a transmission of the packet in buffer location 64 in response to a determination at circuit 36 that the channel to terminal 16 is available, but a collision will occur if the packet in buffer location 62 is globally transmitted. The packet selection device 74 may be used to further enhance the throughput of the LAN.

The hub includes a transmission tracking device 76 which is used in isolating the terminals 10–20 that have not received a transmission of an individual data packet from those terminals that have received the data packet. That is, the tracking takes place on a terminal-by-terminal and packet-by-packet basis. In the example set forth immediately above, the tracking device 76 determines that the data packet in the buffer location 62 has not been received by any of the destination terminals, while the data packet in the buffer location 64 has been received by all of the destination terminals other than the terminal 16. For example, the tracking device may set up a table in computer memory. After all of the destination terminals have received the data packet of a particular buffer location, the packet is deleted from memory 40.

The hub includes six conventional transmitters 78, 178, 278, 378, 478 and 578 that are utilized to forward data packets from memory 40 to the six destination terminals 10–20. As previously noted, the hub forwards each incoming data packet to all of the terminals, allowing each terminal to determine whether the packet was intended for that terminal.

A buffer monitor 80 is used to track the available space at the buffer memory 40. The concern is that incoming packets will continue to be received at the receivers 58, 158, 258, 358, 458 and 558 after the memory is exhausted, causing packets to be lost. Thus, a memory threshold is selected, and the buffer monitor 80 detects when the threshold has been exceeded. In the event that the threshold has been exceeded, the monitor triggers a pseudo-collision generator 82 that sends a signal to the transmitters 78, 178, 278, 378, 478 and 578 for temporarily inhibiting transmissions from the terminals 10–20 to the memory 40. A collision condition is selectively imposed until the transmission of packets from the memory 40 lowers the storage to below the preselected threshold. The pseudo-collision generator 82 is not critical to the invention. Other mechanisms for creating a collision condition in order to inhibit transmissions from the terminals may be utilized.

Another concern in the operation of a high-performance LAN is that one terminal will "capture" the network. Under the capture effect, a first terminal may gain a competitive advantage over one or more other terminals following repeated successes in gaining access to the hub after collisions. For example, if the terminal 12 of FIG. 2 is competing with terminal 14, and terminal 12 has successfully transmitted three packets following collisions with the same packet from the terminal 14, a next collision between packets from the same terminals will likely result in the terminal 12 again gaining access to the hub 22. This is because the fourth packet from the terminal 12 will be encountering its first collision, while the packet from the terminal 14 will be encountering its fourth collision. Implementation of the back-off calculations of the table in FIG. 1 will allow the terminal 12 to have the competitive advantage over the terminal 14.

In FIG. 4, the hub includes a capture monitor 84 that is used to detect an event in which one of the six terminals repeatedly succeeds in gaining access for retransmissions following collisions. When such an event occurs, a back-off correction device 86 may be used to reduce the likelihood that the repeatedly successful terminal will gain access following a next collision. The back-off correction device is connected to the pseudo-collision generator 82 to selectively induce collisions that are designed to correct the capture condition.

Figure 5:
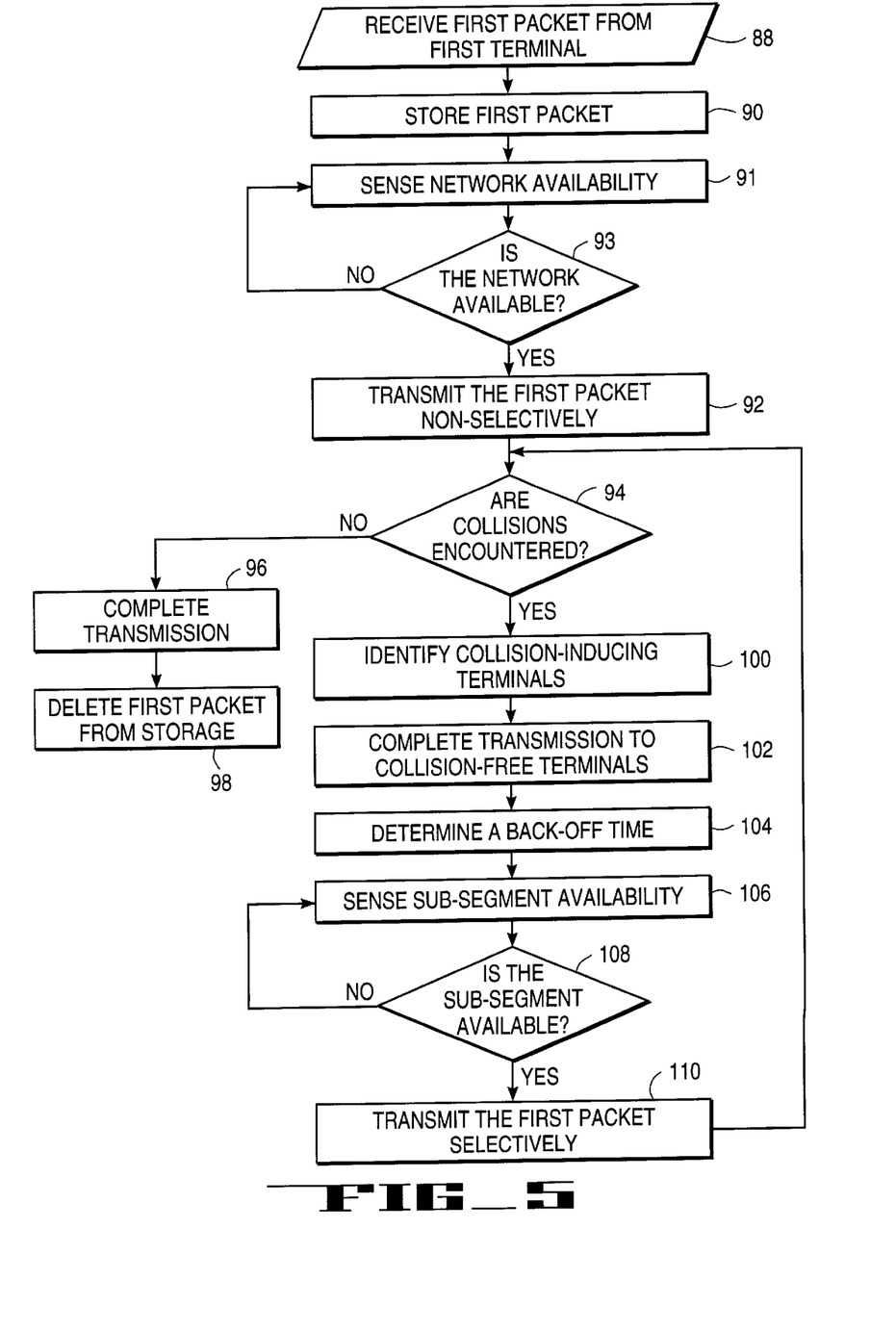
FIG. 5 is a process flow of a method of managing data transmission collisions within the network of FIG. 2, in accordance with the invention.

The method of operating the LAN of FIG. 2 has been described above. Nevertheless, the process steps for managing transmission collisions within the network are shown in FIG. 5. In step 88, a first data packet is received from one of the terminals. For example, the originating terminal may be terminal 10 in FIGS. 2 and 3. The first data packet is stored 90 at the buffer memory 40. The first packet "dominates" the collision domain during the arrival.

While the first data packet is being stored, the availability of the network for globally transmitting the first data packet is sensed, as shown at step 91. If it is determined at decision step 93 that the network is available, the first packet is forwarded at step 92 from the hub 22 to the terminals non-selectively. That is, in the preferred embodiment, the packet from one terminal is forwarded to all of the terminals within the star LAN. Each individual destination terminal then determines whether it is the intended terminal for the particular message of the data packet. During the non-selective transmission of step 92, one or more collisions may be encountered between the first packet and a packet from a destination terminal. At decision step 94, the collision detection circuits 38, 138, 238, 338, 438 and 538 of the hub 22 are utilized in a conventional manner to detect collisions. However, if a collision is detected, the hub isolates the collision-free terminals from the collision-inducing terminals.

For situations in which no collisions are encountered at step 94, the non-selective transmission to the terminals is completed at step 96 and the first packet is deleted from storage at step 98. On the other hand, if one or more collisions are encountered, the transmission to collision-free terminals is completed at step 100, while the collision-inducing terminals are marked at step 102. Referring briefly to FIG. 4, the transmission tracking device 76 is used to track the transmissions on a packet-by-packet and terminal-by-terminal basis.

A back-off time is then calculated for the retransmission of the first packet to the identified collision-inducing terminals, as shown at step 104. In the preferred embodiment, the back-off calculations of the hub are different than the back-off calculations for the terminals. The back-off times for the hub are preferably less than those of the terminals, providing the first data packet with a higher priority on the network. This higher priority is intended to reduce the idle time of the physical layer, thereby increasing network throughput and reducing the latency of the packets through the network and reducing the size of the hub buffer 40. Optionally, the back-off time for the hub is 0.

At step 106, the sub-segment availability is sensed, using the one or more carrier sense circuits 36, 136, 236, 336, 436 and 536 that are associated with the collision-inducing terminals. If at decision step 108 the channel is not available for transmission of the first packet to the identified collision-inducing terminals, the process returns to step 106. When the network is available, the first packet is selectively transmitted. That is, the packet is forwarded to the collision-inducing terminals identified at step 102. Once the transmission has been initiated, the process loops back to decision step 94 of detecting any collisions that may be encountered. If no collisions are encountered, the selective transmission is completed at step 96 and the first packet is deleted from storage at step 98. Alternatively, when a collision is encountered, the process moves to step 100. At step 100, if a subset of the previous collision-inducing terminals is now collision-free, the transmission is completed to the subset of terminals. The remaining terminals are then identified as the collision-inducing terminals at step 102, the transmission tracking device 76 is updated, and the process continues until all of the destination terminals have received the transmission and the first packet is deleted from storage at step 98.

What is claimed is:

1. A method of managing data transmission collisions within a network having terminals connected to a hub comprising steps of:

directing data packets to said hub when said data packets are generated at one of said terminals for global transmissions to a plurality of destination terminals of said network, said global transmissions being non-selective with respect to which of said destination terminals are target terminals identified in the contents of said data packets;

forwarding said data packets from said hub toward said destination terminals, thereby providing first transmissions;

retaining said data packets in storage at said hub in response to detection of a transmission collision in forwarding said data packets to at least one collision-inducing destination terminal, while completing said forwarding of said data packets to any remaining destination terminals for which said forwarding is collision-free, thereby isolating subsequent forwarding of said data packets to said collision-inducing destination terminals;

forwarding said data packets from said hub to each of said collision-inducing destination terminals when a collision-free condition is determined to be available for said collision-inducing destination terminals, thereby providing second transmissions, said second transmissions being non-selective with respect to which of said destination terminals are target terminals identified in the contents of said data packets;

retaining said data packets in storage at said hub in response to detection of a second transmission collision in forwarding said data packets to a subset of said collision-inducing destination terminals, while completing said forwarding of said data packets to any said destination terminals which were collision-inducing terminals during said first transmissions but were collision-free during said second transmissions; and forwarding said data packets from said hub to said subset of collision-inducing destination terminals at which a second transmission collision was detected so as to complete said global transmissions of said data packets, thereby providing third transmissions, said forwarding being non-selective with respect to which of said collision-inducing destination terminals are target terminals identified in the contents of said data packets.

2. The method of claim 1 wherein said step of directing said data packets to said hub includes utilizing a Carrier Sense Multiple Access with Collision Detection (CSMA/CD) protocol to determine accessibility to said hub.

3. The method of claim 1 wherein said steps of forwarding said data packets from said hub include utilizing CSMA/CD.

4. The method of claim 1 further comprising a step of deleting said data packets stored at said hub after all of said destination terminals have received said data packets.

5. The method of claim 1 further comprising selecting a memory threshold such that said hub enters a blocking mode when stored data packets at said hub exceed said memory threshold, including implementing said blocking mode such that said hub triggers a collision condition for any data packets directed at said hub while said memory threshold is exceeded.

6. The method of claim 1 further comprising a step of monitoring which of said terminals are repeatedly successful in gaining access to forwarding data packets to said hub following transmission collisions and further comprising a step of intentionally inducing transmission collisions to reduce a likelihood that said repeatedly successful terminal will successfully gain access following a next transmission collision.

7. The method of claim 1 further comprising a step of defining a back-off algorithm such that packet transmissions from said hub to said terminals have a higher priority than packet transmissions from said terminals to said hub.

8. The method of claim 7 further comprising a step of executing said back-off algorithm upon each transmission collision of data packets between said hub and one of said terminals.

9. A method of managing data transmission collisions in a collision domain that utilizes a CSMA/CD protocol within a network of terminals connected by a common hub, said method comprising steps of:

storing a first data packet at said hub when a sending terminal achieves packet-transmission access to said hub for transmitting said first data packet;

initiating transmission of said first data packet from said hub to each of said terminals connected by said hub;

completing said transmission of said first data packet to any first terminals for which no collision is detected;

backing-off said transmission of said first data packet to any second terminals for which collisions are detected, including determining a back-off time utilizing a back-off algorithm that is weighted to provide a higher priority to hub-to-terminal transmissions relative to terminal-to-hub transmissions;

initiating retransmission of said first data packet to all of said second terminals, said initiated retransmissions being in accordance with said determined back-off time and being executed without accessing contents of said first data packet;

completing said retransmission to said second terminals, including repeating said steps of backing-off and initiating retransmission for any of said second terminals for which a collision is detected; and deleting said first data packet from storage at said hub when all of said second terminals have received said first data packet during one of said retransmissions.

10. The method of claim 9 further comprising a step of storing a second data packet at said hub during said steps of initiating and completing said retransmission to said second terminals, said second data packet being received from one of said first terminals.

11. The method of claim 10 further comprising a step of transmitting said second data packet to a plurality of terminals while utilizing collision detection on a terminal-by-terminal basis.

12. A network that utilizes collision detection and transmission back-off in managing data transmissions comprising:

a hub having buffer memory for storing data packets upon receipt of said data packets at said hub;

a plurality of terminals connected to said hub by channels for exchanging data packets, each terminal having a terminal carrier sense circuit to determine accessibility of said hub to data packet transmissions to said buffer memory, each terminal further having a terminal collision sense circuit to detect a data packet transmission collision between said each terminal and said buffer memory;

a hub carrier sense circuit at said hub to determine, on a terminal-by-terminal basis, accessibility of said terminals to data packet transmissions from said buffer memory to a plurality of said terminals;

means at said hub for tracking, on a terminal-by-terminal and packet-by-packet basis, which of said terminals have received transmissions of individual data packets from said buffer memory, thereby isolating first terminals that have received a particular data packet from second terminals to which said particular data packet is to be transmitted; and a transmitter at said hub for globally transmitting each said data packet to all of said first and second terminals, said transmitter and said means for tracking being cooperative to globally transmit said individual data packets in an absence of accessing contents of said individual data packets, said transmitter being enabled to transmit each said data packet in increasingly smaller subsets of said second terminals in response to isolation of said first terminals by said means for tracking.

13. The network of claim 12 wherein each terminal includes a terminal back-off algorithm for determining a back-off time prior to retransmission of a data packet following detection of a transmission collision by said terminal collision sense circuit of said each terminal, said hub having a hub back-off algorithm for determining a back-off time following detection of a transmission collision, wherein said hub back-off algorithm is implemented such that retransmissions from said buffer memory to said terminals have a higher priority than retransmissions from said terminals to said buffer memory.

14. The network of claim 12 wherein said hub includes a means for inhibiting transmissions from said terminals to said buffer memory when said stored data packets at said buffer memory exceed a preselected threshold.

15. The network of claim 12 wherein said terminals are connected to said hub in a half-duplex arrangement and said hub is an Ethernet hub.

\* \* \* \* \*